C. J. CRUŸFF.
REVOLVING DOOR.
APPLICATION FILED JAN. 19, 1909.
941,699.
Patented Nov. 30, 1909.
6 SHEETS—SHEET 1.
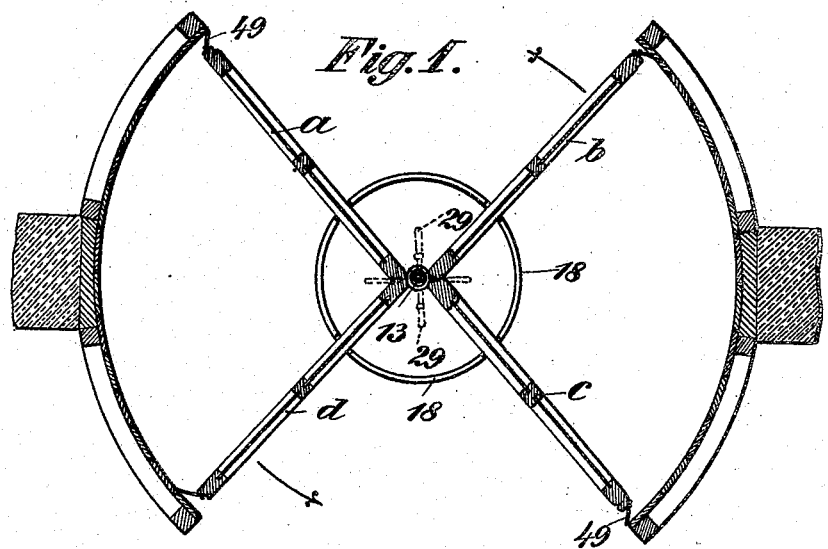
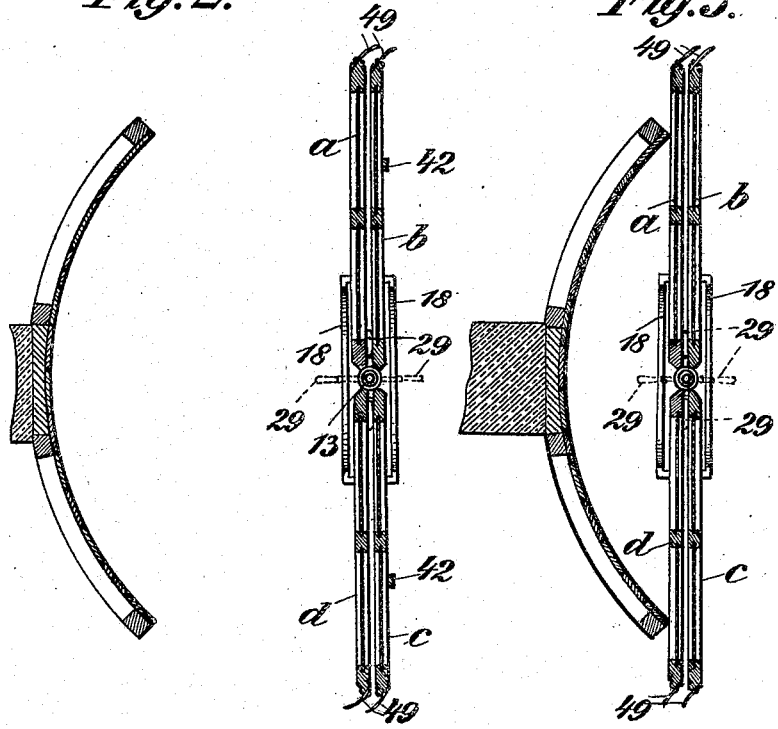 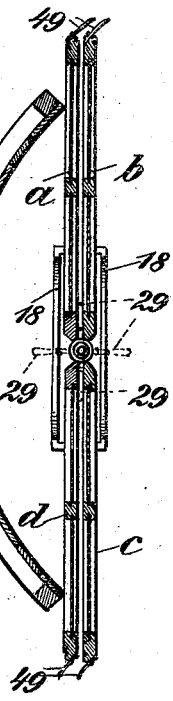
Witnesses:
Inventor:
Cornelis Johannes Cruÿff

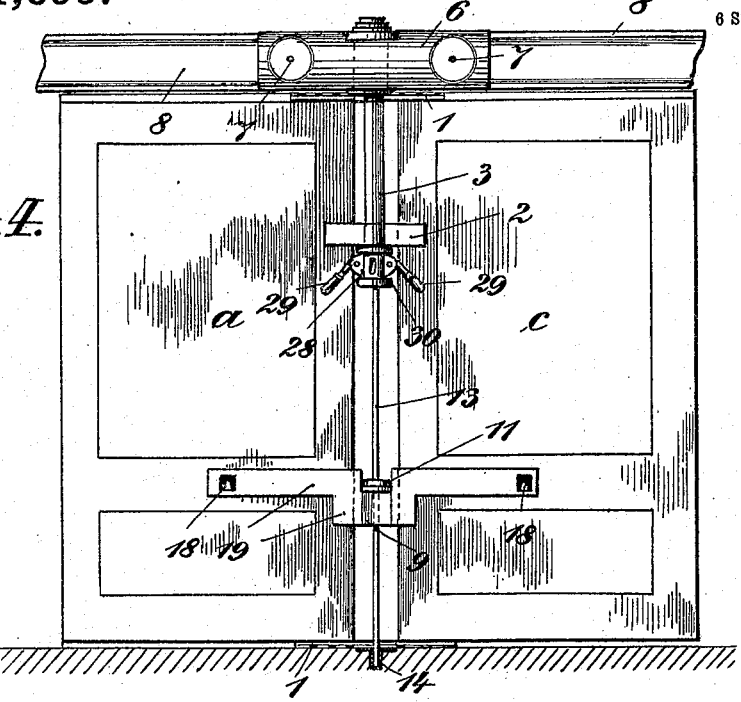
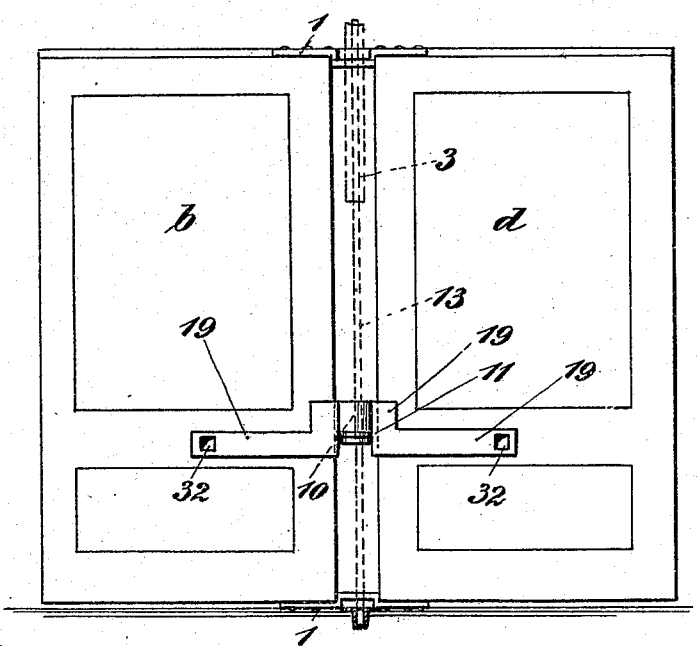

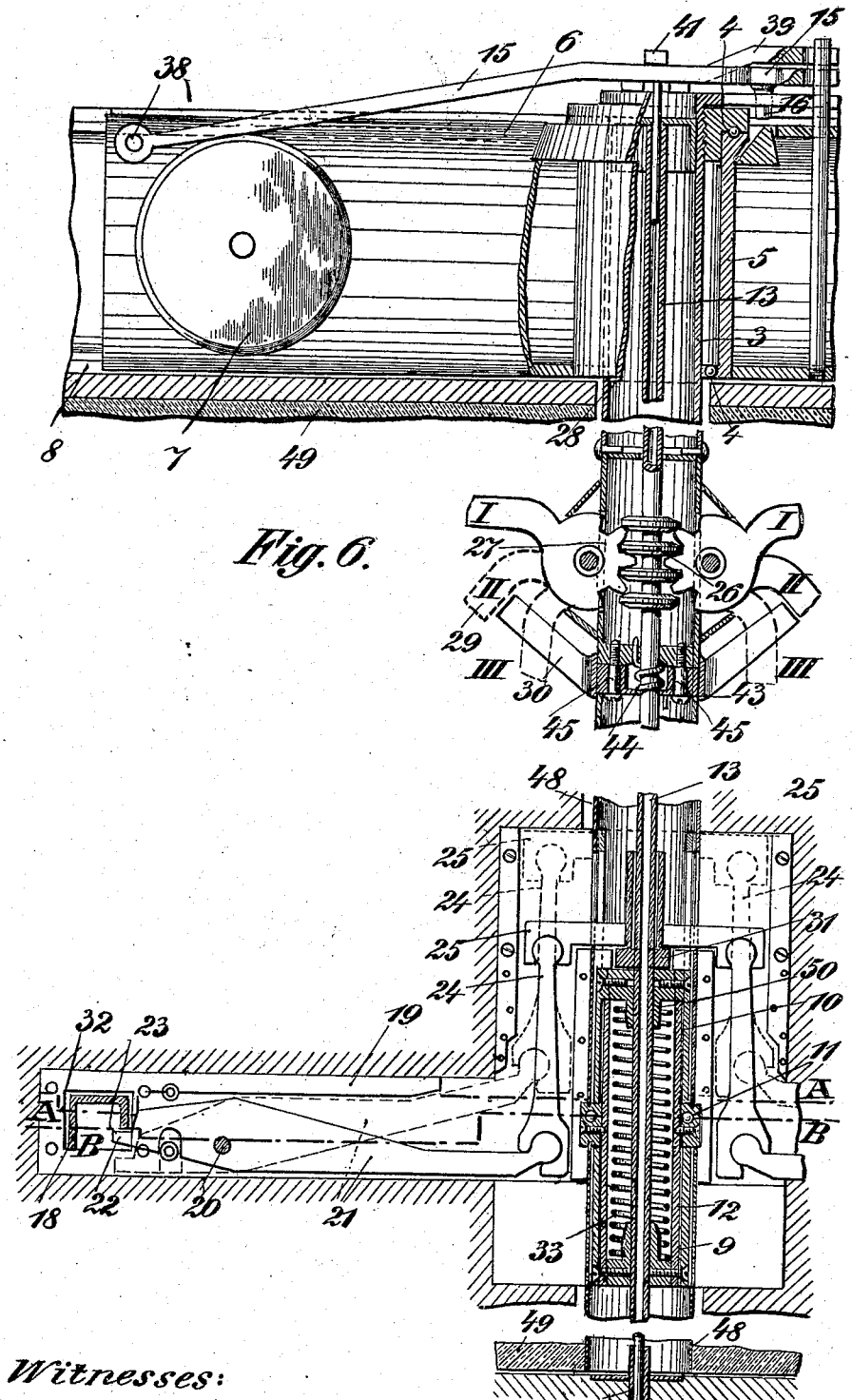

C. J. CRUŸFF.
REVOLVING DOOR.
APPLICATION FILED JAN. 19, 1909.
941,699.
Patented Nov. 30, 1909.
6 SHEETS—SHEET 4.
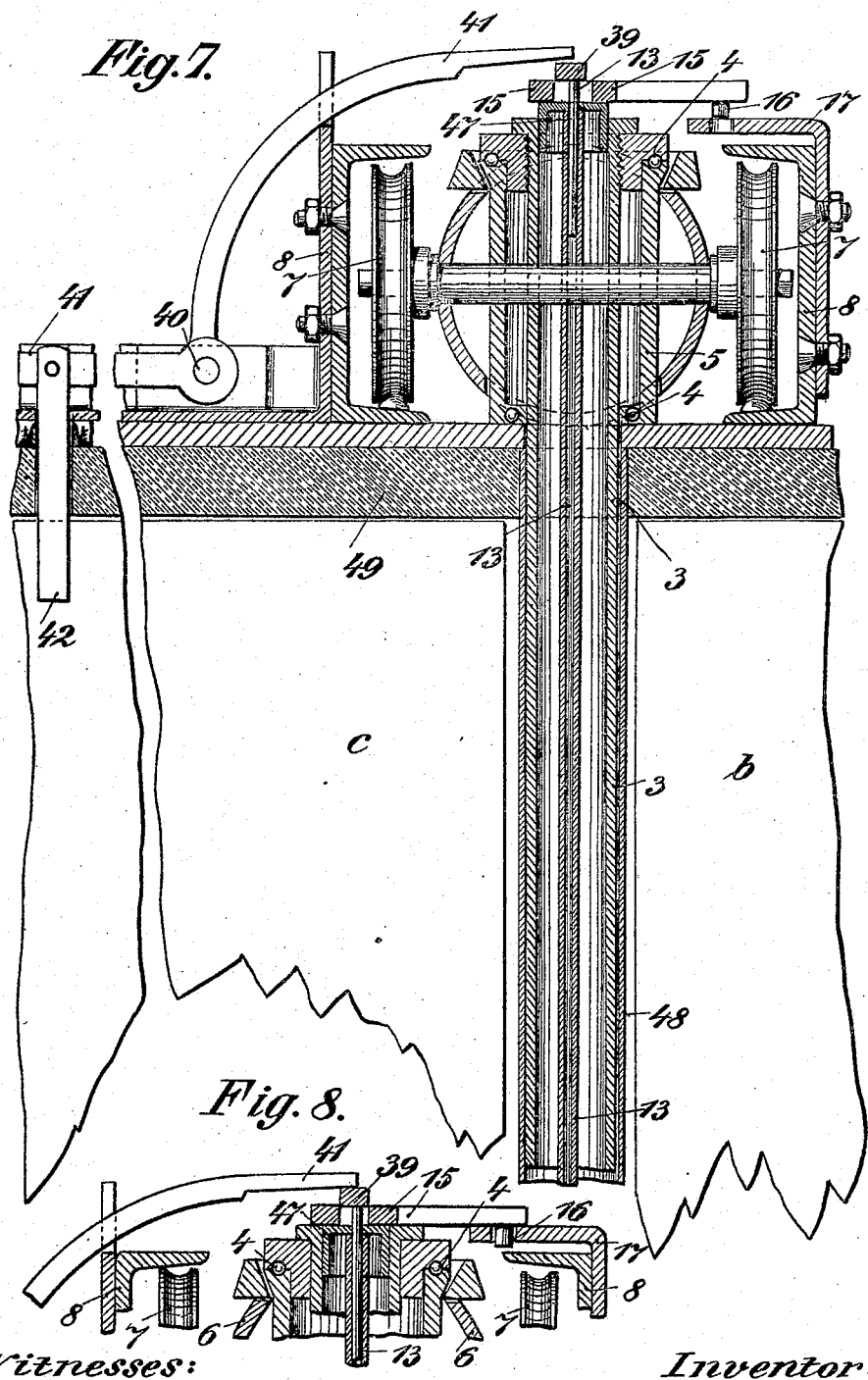
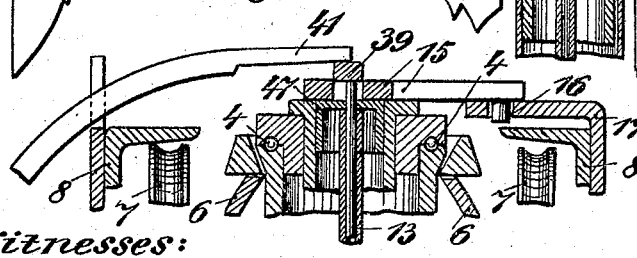

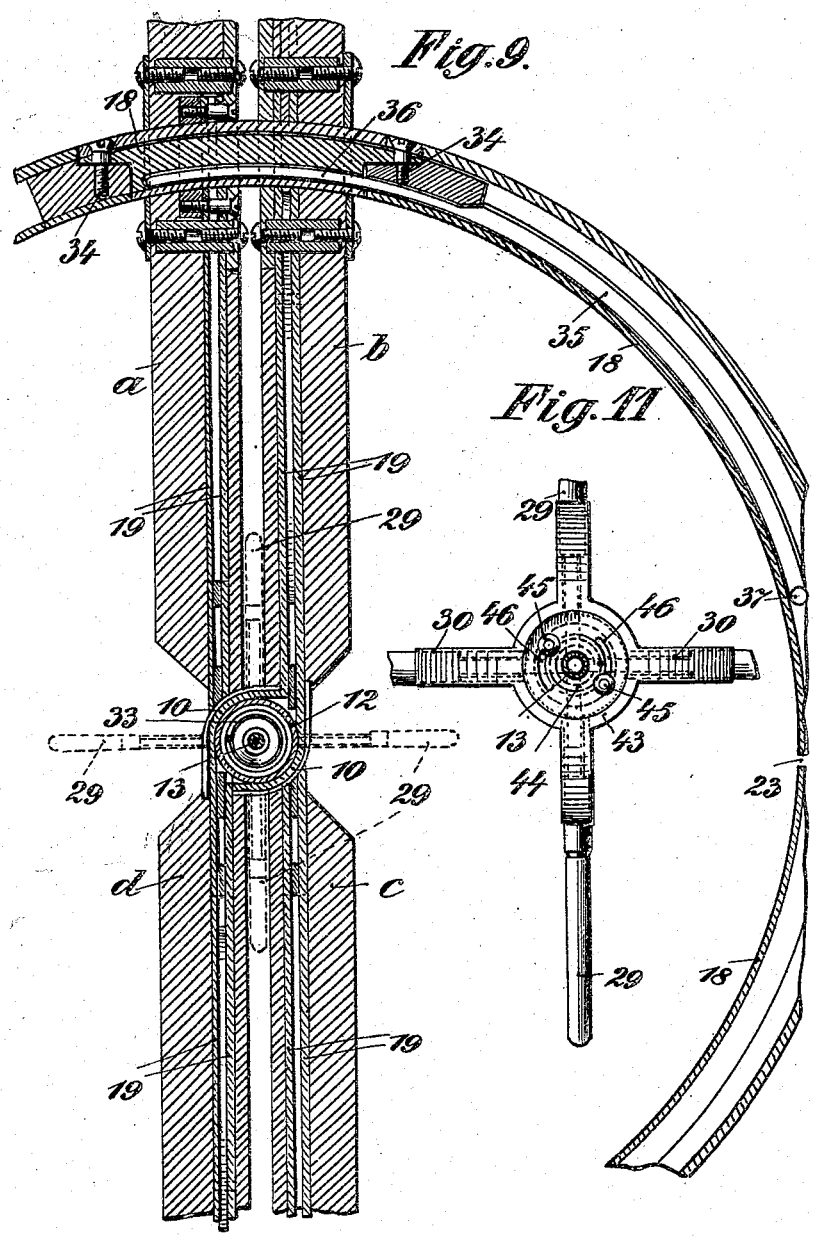

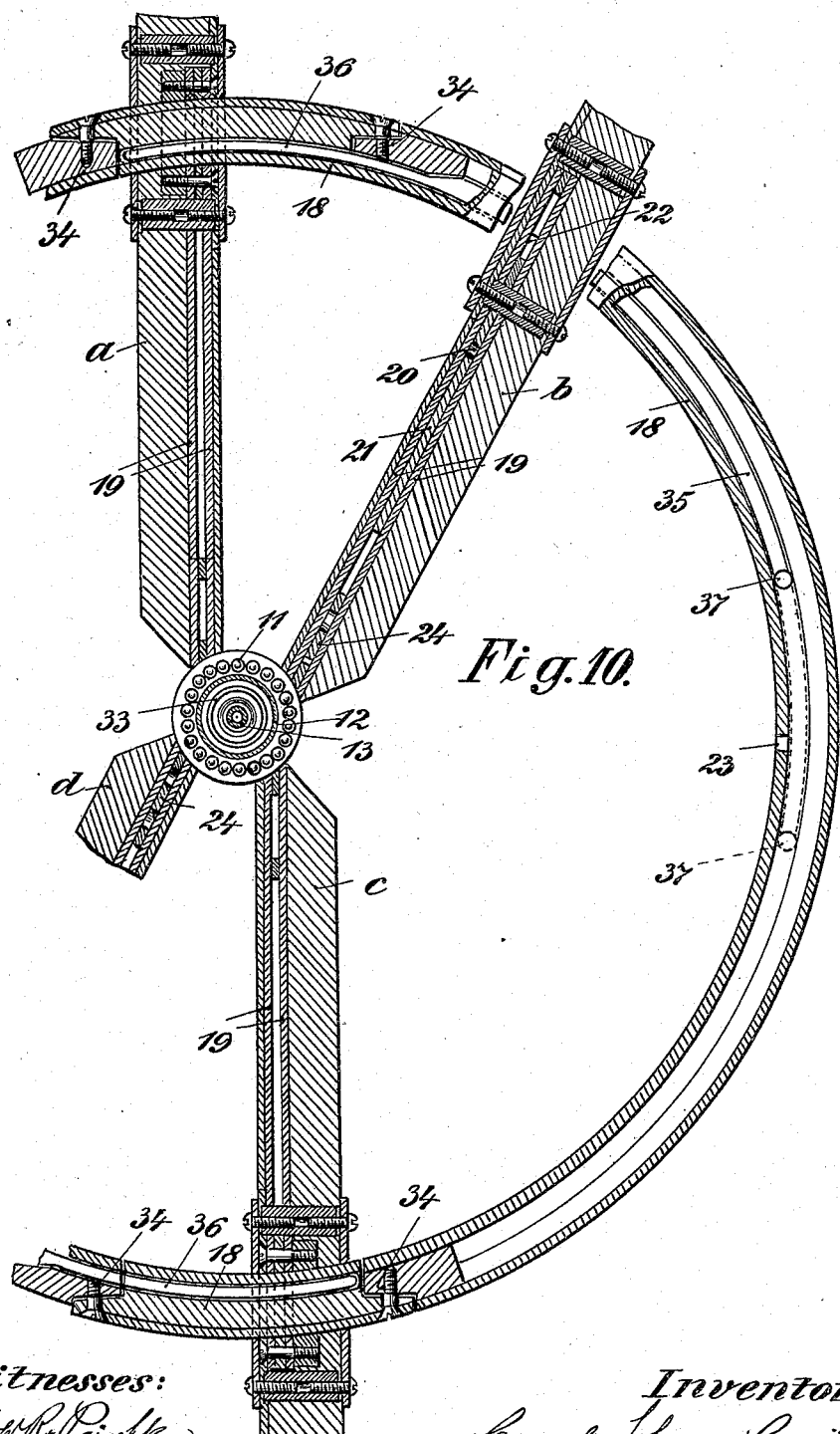

UNITED STATES PATENT OFFICE.

CORNELIS JOHANNES CRUŸFF, OF AMSTERDAM, NETHERLANDS.

REVOLVING DOOR.

941,699.	Specification of Letters Patent.	Patented Nov. 30, 1909.

Application filed January 19, 1909. Serial No. 473,119.

*To all whom it may concern:*

Be it known that I, CORNELIS JOHANNES CRUŸFF, a subject of the Queen of the Netherlands, and resident of 146 Voorburgwal, Amsterdam, Netherlands, have invented certain new and useful Improvements in Revolving Doors, of which the following is a specification.

This invention relates to a revolving door comprising a plurality of spring-controlled wings so disposed as to be locked in their crossed position and to be disengaged by operating a handle whereupon the wings are moved by the springs toward one another into a parallel position. The entire door is moreover, suspended in a carriage slidably disposed in the door casing but normally retained stationary, while the lower door-pivot engages in a step-bearing. The construction is such as to cause a further motion of the handle to lift the pivot from its bearing and thereby release the lock of the suspension carriage and at the same time the door which then can be moved sidewise in the door casing. It is to be understood that the various locking devices are released by a single handle whereafter the door can at once be moved sidewise. To prevent the folded doors from further turning, stops are moved in the path of such doors at the same time when the locking devices are released, said stops permitting of the lateral movement of the doors in one direction only.

The accompanying drawings show the revolving door constructed according to this invention, and Figure 1 is a horizontal section in its closed position. Fig. 2 is a fractional section of a portion showing the door wings in the parallel position. Fig. 3 is a similar view in which the folded wings are moved to the side of the door-opening. Fig. 4 is a side elevation of one pair of door wings, while Fig. 5 shows the other pair of doors. Fig. 6 is a vertical section through the axis of the door showing on a larger scale details of mechanism connected therewith. Fig. 7 is a vertical section taken at right angles to Fig. 6, showing the upper mechanism of the suspended door pivot. Fig. 8 is a detail of Fig. 7. Fig. 9 is a horizontal section on the line A—A of Fig. 6. Fig. 10 is a similar section on line B—B of Fig. 6. Fig. 11 is a detail view.

The door has four wings $a$, $b$, $c$, $d$ respectively of which the opposite wings $a$ and $c$ as well as $b$ and $d$ are rigidly fixed together by bands 1 (Figs. 4, 5) and thus form two double wings $a$, $c$ and $b$, $d$. The wings $a$, $c$ are by means of a band 2 fixed to a tube 3 (Fig. 4) the upper end of which is furnished with ball bearings 4 (Figs. 6 and 7) and suspended in a sleeve or socket 5 fixed in a truck 6. The truck runs on rollers 7 in U-shaped rails 8 disposed above the door in the frame thereof.

On the double wing $a\,c$ is further fixed a bearing sleeve 9 connected with a hinge band 19, see Fig. 4. Upon the bearing sleeve 9 is seated a bearing sleeve 10 of a similar hinge band 19 fixed to the double wing $b$, $d$ (Figs. 5, 6 and 9), the sleeves having between them a ball bearing 11 which allows of the double wing $b$, $d$ being turned toward the double wing $a$, $c$. In the hinge-sleeves 9 and 10 of the bands 19 is fitted a tubular hinge-pin 12 (Figs. 6 and 9).

Through the center of the tube 3 passes a rod 13 extending throughout the length of the door as well as through the sleeve 5 of the truck 6 and through the lower bands 1 of the double wings. The lower projecting end of the rod 13 engages in a socket-bearing 14 (Figs. 4 and 6) so that a lateral displacement of the door is impossible while the rod 13 is retained in the bearing 14. The door is further secured in its operative position by means of a locking lever 15 pivoted to the truck 6 (Figs. 6, 7 and 8) and normally engaging with a projection or pin 16 in one of the rails 8 or in an angle piece 17 rigidly fixed to such rail. It is advantageous to provide each door-wing, at the sides, top and bottom with draft excluding rubber strips 49, adapted to brush along the door frame and the floor.

In order to fix the two double door-wings in their crosswise position, the double wing $a$, $c$ carries a fixed ring 18 with which the wing $b$, $d$ can be coupled by the following means: In the hinge bands 19 of the wings $b$ and $d$ there is in each mounted on a pin 20 a two-armed locking lever 21 (Figs. 6 and 10). One end of each lever 21 can engage with its tooth 22 in a notch 23 of the ring 18, while the opposite end of said levers engages a link 24 which is connected with a yoke 25 loosely mounted on the rod 13 and resting on a collar 31 fixed to the former.

It will be seen that by raising the yoke 25 the teeth 22 will disengage from the notches 23 and so uncouple the double wing $b\ d$ from the ring 18. This is effected through the intervention of a plurality of rings 26 provided on the rod 13 for engagement with four toothed sectors 27 mounted on pivots in a sleeve 28 and provided each with a handle 29, see Figs. 1, 4 and 6. In the operative position of the wings, the handles 29 are situated between the various wings. When the double wing $b$, $d$ is coupled to the ring 18 so that the four wings form a cross, the handles 29 will be in the position I indicated in Fig. 6. The wings are then rigidly coupled together and turn like an ordinary revolving door on the axis 3 in the truck 6.

By turning one of the handles so as to assume position II, the other three handles will also move and will raise the rod 13. To prevent the handles being depressed too much and the rod 13 being drawn out of its socket bearing 14, I provide revolving stops 30 for limiting the movement of the handles. The lifting of the rod 13 which has a fixed collar 31, brings about the upward motion of the arms 25 and links 24 and thereby effects the releasing of the teeth 22 of the locking levers 21 from their engagement with the notches 23 of the ring 18. The double wing $b$, $d$ is now disengaged from the ring 18 so that the former can be turned by reason of the openings 32 which are large enough to easily pass over the ring 18.

The tubular pivot 12 contains a strong spiral spring 33 having one end fixed to a collar 50 fast in the sleeve 10 of the hinge-band 19 of the double wing $b$, $d$ while the other end is similarly fixed to the sleeve 9 of the other double wing $a$, $c$. Practically the said spring is secured by one end to the hinge-band 19 of the wings $a$ and $c$ and by its other end to the hinge-band 19 of the wings $b$ and $d$, and the spring is in tension when the wings are in the crosswise position. As soon as the double wing $b$, $d$ is uncoupled from the ring 18, the spring comes into action and turns the said double wing and brings the same into a parallel position with the double wing $a$, $c$ (Fig. 2).

The coupling ring 18 is composed of several pieces of channel iron hinged together (Figs. 9 and 10). In this manner, the two double wings can be folded against each other and the external portions of the ring 18 can then be folded down (Figs. 2 and 3). For this purpose the U-shaped ring portions 18 projecting from the folded door wings, are each provided with two hinges 34. For locking the parts of the ring in the horizontal position before returning the wings to their crosswise position, each of the parts is furnished with a sliding bolt 35 (Figs. 9 and 10) formed with a projecting horn 36 adapted to pass beyond the hinge and into the fixed portion of the ring and thus render the parts rigid. When the double wing $b$, $d$ is placed crosswise it comes into contact with a pin 37 rigidly fixed at the end of each bolt 35 and then withdraws the bolts 35 with their horns 36 from the hinges 34. When now the double wing $b$, $d$ is moved by its spring 33 into a parallel position, the outer portions of the ring 18 will fold downward.

To prevent the folded door from being moved from its middle position shown in Fig. 2, the rod 13 while being lifted into the position II, Fig. 6 for uncoupling the double wing $b$, $d$, is caused to lift a single lever 39 pivoted on the pivot 38 of the lever 15 (Figs. 6 and 8). The lever 39 supports the free ends of two two-armed levers 41, disposed above the door in the frame thereof and pivoted as at 40, each of said levers carrying with its other end a depending stop pin 42. Thus, the lifting of the rod 13 causes the pins 42 to move outward from the holes in the door-frame as indicated in dotted lines and so prevent the further advance of the door. For each wing $b$ and $c$ there is provided a similar stopping device but having the stop pins 42 so disposed as to permit of the bodily sidewise displacement without turning of the folded door. (Fig. 2.)

For the bodily displacement of the door, it is first necessary to lift the rod 13 out of its socket bearing 14 by turning one of the handles 29 into the position III indicated in dotted lines at Fig. 6. This can only be done after the revolving stops 30 have been removed from the path of the handles. The revolving stops form parts of a revolving annulus 43 mounted on the sleeve 28 (Fig. 6) and furnished with a retaining spring 44. The annulus 43 has slots 46 in which pins or screws 45 engage for limiting the angular displacement of the stops 30 to the proper position for the complete depressing of the handles 29. (Figs. 6 and 11). By moving the handles back to the position I, the spring 44 turns the annulus 43 back in its locking position so that the stops 30 are again beneath the handles 29.

The upper end of the rod 13 is fitted with a tappet 47 which, at the complete lifting of said rod from its socket bearing 14, comes against the lever 15 and so disengages the pin 16 thereof from the angle piece 17 (Fig. 7). Thus, the truck 6 is unlocked and the entire door can be shifted to one side by the truck (Fig. 3).

The construction and the operation of the door are of a simple nature and the releasing of all the locking devices is effected by one handle. All the door movements require but a few seconds for throwing open the entire passage way in the door casing.

It is advantageous to provide for a uniform appearance of the various parts forming the axis of the door by surrounding the said parts with a tubular casing 48 (Figs. 6 and 7).

What I claim as my invention and desire to secure by Letters Patent is:—

1. In a revolving door the combination of an axle, a plurality of wings turnably attached to the latter, means to lock the said wings in their crosswise position, a truck slidably disposed in the door casing, the said wings being suspended on the said truck, means to secure the latter in its normal position, means to release the said locking means for said wings and the said securing means for said truck, and a spring adapted to place the said wings, when unlocked, parallel to each other, substantially as and for the purpose set forth.

2. In a revolving door the combination of a vertically arranged axle adapted to be lifted, a plurality of wings loosely attached to the latter, means to lock the said wings in their crosswise position, a truck laterally shiftable in the door casing, the said wings being suspended on said truck, means to secure the latter in its normal position, means to release the said locking means for said wings and said truck and adapted to be operated by lifting of the said axle, means to lift the said axle, and a spring acting on said wings and adapted to place the latter, when unlocked, parallel to each other, substantially as and for the purpose set forth.

3. In a revolving door the combination of hollow axle, two double wings fixed to the latter, a truck laterally shiftable in the door casing, means to secure the said truck in its normal position, the said hollow axle being turnably suspended in the said truck, a horizontal ring rigidly connected with one of the said double wings, locking levers disposed in the other double wing and adapted to couple the latter with the said ring, a vertically shiftable rod in the said hollow axle and adapted to release the said locking levers and the said securing means for the said truck, means to lift the said vertical rod, and a spring acting on said double wings and adapted to place the said double wings, when unlocked, parallel to each other, substantially as and for the purpose set forth.

4. In a revolving door the combination of a hollow axle, two double wings attached to said hollow axle, one of said double wings fixed to said axle, the second double wing being turnably connected with the first said double wing, a truck slidably disposed in the door casing, said hollow axle being turnably suspended in the said truck, means to secure the said truck in its normal position, a horizontal ring rigidly connected with one of the said double wings, locking levers disposed in the other double wing and adapted to engage into notches in the said ring, a vertically shiftable rod in the said hollow axle, a socket bearing for the lower end of the said rod, a collar rigidly fixed on the said rod, a yoke loosely arranged on the latter and resting on the said collar, links connecting the said yoke with the said locking levers, toothed means adapted to lift the said vertical rod, the latter being adapted to disengage the said securing means for the said truck, and a spiral spring acting on the said two double wings and adapted to place the latter parallel to each other, substantially as and for the purpose set forth.

5. In a revolving door the combination of a hollow axle, two double wings attached to said hollow axle, one of said double wings fixed to said axle, the second double wing being turnably connected with the first said double wing, a truck slidably disposed in the door casing, said hollow axle being turnably suspended in the said truck, means to secure the said truck in its normal position, a horizontal ring rigidly connected with one of the said double wings, said ring having linked parts adapted to fold downward, when the said double wings are being placed parallel to each other, locking bolts slidable in the said foldable ring and adapted for normally locking the latter in its normal position, means to withdraw the said locking bolts from the locking position, when the said double wings are being returned to the crosswise position, locking levers disposed in the other double wing and adapted to engage into notches in the said foldable ring, a vertically shiftable rod in the said hollow axle, a socket bearing for the lower end of said rod, a collar rigidly fixed on the said rod, a yoke loosely arranged on the latter and resting on the said collar, links connecting the said yoke with the said locking levers, toothed means adapted to lift the said vertical rod, the latter being adapted to disengage the said securing means for the said truck, and a spiral spring acting on the said two double wings and adapted to place the latter parallel to each other, substantially as and for the purpose set forth.

6. In a revolving door in combination, a hollow axle, two double wings attached to said hollow axle, one of said double wings fixed to said axle, the second double wing being turnably connected with the first said double wing, a truck slidably disposed in the door casing, said hollow axle being turnably suspended in the said truck, means to secure the said truck in its normal position, a horizontal ring rigidly connected with one of the said double wings, said ring having linked parts adapted to fold downward, when the said double wings are placed parallel to each other, locking bolts slidable in the said foldable ring and adapted for normally locking the latter in its normal position, means to withdraw the said locking bolts from the locking position, when the said double wings are being returned to the crosswise position, locking levers pivotally fixed in the other of the said double wings, notches in the said foldable ring, said locking levers adapted to engage into said notches, the latter being arranged to hold the said double wings in their crosswise position, a vertically shiftable rod in the said hollow axle, a socket bearing for the lower end of the said rod, a collar rigidly fixed on the said rod, a yoke loosely arranged on the latter and resting on the said collar, links connecting the said yoke with the said locking levers, a number of teeth on the said vertical rod, a number of toothed sectors engaging with the said teeth, handles for turning the said sectors and to lift the said vertical rod, said vertical rod being adapted to release the said securing means for the said truck, and a spiral spring acting on the said two double wings and adapted to place the latter parallel to each other, substantially as and for the purpose set forth.

7. In a revolving door in combination, a hollow axle, two double wings attached to said hollow axle, one of the said double wings fixed to said axle, the second double wing being turnably connected with the first said double wing, a truck slidably disposed in the door casing, said hollow axle being suspended on a ball bearing in the said truck, means to secure the latter in its normal position, a horizontal ring rigidly connected with one of the said double wings, said ring having linked parts adapted to fold downward, when the said double wings are placed parallel to each other, locking bolts slidable in the said foldable ring and adapted for normally locking the latter in its normal position, a pin fixed to each of the said locking bolts and arranged to come into contact with and to be moved by one of the said double wings, when the latter are turned to their crosswise position, locking levers pivotally fixed in the other of the said double wings, notches in the said foldable ring, said locking levers adapted to engage into said notches, the latter being arranged to hold the said double wings in their crosswise position, a vertically shiftable rod in the said hollow axle, a socket bearing for the lower end of said rod, a collar rigidly fixed on the said rod, a yoke loosely arranged on the latter and resting on the said collar, links connecting the said yoke with the said locking levers, a number of teeth on the said vertical rod, a number of toothed sectors engaging with the said teeth, handles to turn the said sectors and to lift the said vertical rod, displaceable stops for said handles and adapted to prevent the said vertical rod from being lifted from its socket bearing, said vertical rod being adapted to release the said securing means for the said truck, and a spiral spring acting on the said two double wings and adapted to place the latter parallel to each other, substantially as and for the purpose set forth.

8. In a revolving door in combination, a hollow axle, two double wings attached to said hollow axle, one of the said double wings fixed to said axle, the second double wing being turnably connected with the first said double wing, a truck slidably disposed in the door casing, said hollow axle being suspended on a ball bearing in the said truck, means to secure the latter in its normal position, a horizontal ring rigidly connected with one of the said double wings, said ring having linked parts adapted to fold downward, when the said double wings are being placed parallel to each other, locking bolts slidable in the said foldable ring and adapted for normally locking the latter in its normal position, a pin fixed to each of the said locking bolts and arranged to come into contact with and to be moved by one of the said double wings, when the latter are turned to their crosswise position, locking levers pivotally fixed in the other of the said double wings, notches in the said foldable ring, said locking levers adapted to engage into said notches, the latter being arranged to hold the said double wings in their crosswise position, a vertically shiftable rod in the said hollow axle, a socket bearing for the lower end of the said rod, a collar rigidly fixed on the said rod, a yoke loosely arranged on the latter and resting on said collar, links connecting said yoke with said locking levers, a number of teeth on the said vertical rod, a number of toothed sectors engaging with the said teeth, handles to turn said sectors and to lift the said vertical rod, turnable stops for said handles and adapted to prevent the said vertical rod from being lifted from its socket bearing, a spring adapted to hold the said stops in the path of the said handles, said vertical rod being adapted to release the said securing means for the said truck, a spiral spring acting on the said two double wings and adapted to place the latter parallel to each other, and means to prevent the said double wings from being turned, when in their folded position, substantially as and for the purpose set forth.

9. In a revolving door the combination of a hollow axle, two double wings fixed to the latter, a truck slidably disposed in the door casing, said hollow axle being turnably suspended in the said truck, a detent lever pivotally fastened to the said truck, a detent pin on the said detent lever and adapted to engage into a hole in the door casing, said detent lever adapted to secure the said truck in its normal position, a horizontal ring rigidly connected with one of the said double wings, locking levers arranged in the other double wing and adapted to couple the latter with the said ring, a vertically shiftable rod in the said hollow axle and adapted to release the said locking levers and to disengage the said detent lever for said truck, means to lift the said vertical rod, a spring acting on said double wings and adapted to place the said double wings, when unlocked, parallel to each other, and means to prevent the said double wings from being turned when in their folded position, substantially as and for the purpose set forth.

10. In a revolving door the combination of a hollow axle, two double wings fixed to the latter, a truck slidably disposed in the door casing, said hollow axle being turnably suspended in the said truck, a detent lever pivotally fastened to the said truck, a detent pin on the said detent lever and adapted to engage into a hole in the door casing, said detent lever adapted to secure the said truck in its normal position, a horizontal ring rigidly connected with one of the said double wings, locking levers arranged in the other double wing, and adapted to couple the latter with the said ring, a vertically shiftable rod in said hollow axle, means to lift the said vertical rod, a spring acting on the said double wings and adapted to place the said double wings, when unlocked parallel to each other, a second lever also pivotally fixed in the said truck, two double armed levers, disposed in the door casing and having one end of each resting on the said second lever, stop pins connected with the free ends of the said two-armed levers and vertically guided in the door casing, said stop pins being adapted to be brought in the path of the said double wings, said vertical rod being adapted to disengage the said detent lever and to operate the said two-armed levers, substantially as and for the purpose set forth.

In testimony whereof I have hereunto signed my name this 22nd day of December 1908, in the presence of two subscribing witnesses.

CORNELIS JOHANNES CRUŸFF.

Witnesses:
W. A. MANICE,
W. F. AAKES.